US007993707B2

(12) United States Patent
Nun et al.

(10) Patent No.: US 7,993,707 B2
(45) Date of Patent: Aug. 9, 2011

(54) PRODUCTION OF COATED SUBSTRATES

(75) Inventors: Edwin Nun, Billerbeck (DE); Heike Bergandt, Marl (DE); Hannelore Armoneit, Recklinghausen (DE); Marie-Theres Wilkes, Dorsten (DE); Thomas Schrief, Haltern am See (DE)

(73) Assignee: Evonik Degussa GmbH, Essen (DE)

( * ) Notice: Subject to any disclaimer, the term of this patent is extended or adjusted under 35 U.S.C. 154(b) by 329 days.

(21) Appl. No.: 12/092,084

(22) PCT Filed: Aug. 10, 2006

(86) PCT No.: PCT/EP2006/065201
§ 371 (c)(1),
(2), (4) Date: May 2, 2008

(87) PCT Pub. No.: WO2007/051662
PCT Pub. Date: May 10, 2007

(65) Prior Publication Data
US 2008/0292799 A1    Nov. 27, 2008

(30) Foreign Application Priority Data
Nov. 3, 2005  (DE) .......................... 10 2005 052 939

(51) Int. Cl.
*B05D 3/02* (2006.01)
(52) U.S. Cl. .................. 427/387; 427/385.5; 427/393.6; 427/384
(58) Field of Classification Search .................. None
See application file for complete search history.

(56) References Cited

U.S. PATENT DOCUMENTS

| 3,245,942 A | 4/1966 | Limperos et al. |
| 5,284,707 A * | 2/1994 | Ogawa et al. ............ 428/333 |
| 5,357,024 A | 10/1994 | Leclaire |
| 5,466,486 A * | 11/1995 | Ogawa et al. ............ 427/352 |
| 6,331,206 B1 | 12/2001 | Wielstra et al. |
| 6,348,269 B1 | 2/2002 | Terry |
| 6,361,871 B1 * | 3/2002 | Jenkner et al. ............ 428/447 |
| 6,620,514 B1 * | 9/2003 | Arpac et al. ............ 428/447 |
| 2003/0069350 A1 * | 4/2003 | Yoshihara et al. ............ 524/588 |
| 2004/0009344 A1 | 1/2004 | Krienke et al. |
| 2004/0110012 A1 | 6/2004 | Bier et al. |
| 2005/0020758 A1 | 1/2005 | Terry |
| 2006/0141223 A1 | 6/2006 | Oles et al. |
| 2006/0147675 A1 | 7/2006 | Nun et al. |
| 2006/0156475 A1 | 7/2006 | Oles et al. |
| 2006/0172641 A1 | 8/2006 | Hennige et al. |
| 2008/0020190 A1 | 1/2008 | Nun et al. |
| 2008/0206174 A1 | 8/2008 | Bergandt et al. |
| 2008/0233063 A1 | 9/2008 | Bergandt et al. |
| 2009/0162631 A1 | 6/2009 | Bergandt et al. |
| 2010/0226869 A1 | 9/2010 | Bergandt et al. |

FOREIGN PATENT DOCUMENTS

| EP | 1 375 615 | 1/2004 |
| GB | 2 041 956 | 9/1980 |
| GB | 2 137 648 | 10/1984 |
| JP | 2003-155411 | * 5/2003 |
| WO | 97 17158 | 5/1997 |
| WO | 99 52964 | 10/1999 |
| WO | WO 2004/027517 | * 4/2004 |
| WO | WO 2005/014731 | * 2/2005 |

OTHER PUBLICATIONS

Abstracts of JP 01-306476 Dec. 1989.*
Translation of JP 01-306476, Dec. 1989.*
U.S. Appl. No. 12/067,855, filed Mar. 24, 2008, Nun, et al.
U.S. Appl. No. 12/092,086, filed Apr. 30, 2008, Nun, et al.
U.S. Appl. No. 12/092,084, filed Apr. 30, 2008, Nun, et al.
U.S. Appl. No. 12/159,103, filed Jun. 25, 2008, Nun, et al.
U.S. Appl. No. 12/094,321, filed May 20, 2008, Nun, et al.
U.S. Appl. No. 12/093,025, filed May 8, 2008, Nun, et al.

* cited by examiner

*Primary Examiner* — Erma Cameron
(74) *Attorney, Agent, or Firm* — Oblon, Spivak, McClelland, Maier & Neustadt, L.L.P.

(57) ABSTRACT

The present invention relates to a process for coating substrates, which comprises the steps:
a) provision of a substrate,
b) application of a composition to at least one surface of the substrate, the composition comprising a silane of the general formula $(Z^1)Si(OR_3)$, where $Z^1$ is OR or Gly (Gly=3-glycidyloxypropyl) and R is an alkyl radical having from 1 to 6 carbon atoms and all radicals R can be identical or different, an inert solvent and an initiator and the inert solvent having a boiling point under the drying conditions of step c) which is in a range from 50° C. above to 50° C. below the drying temperature of step c) and the boiling point of the inert solvent under the drying conditions of step c) being at least 80° C., and
c) drying of the composition applied in step b) at a drying temperature of from 100° C. to 250° C.,
and also to a coated substrate obtainable by means of the abovementioned process.

14 Claims, No Drawings

PRODUCTION OF COATED SUBSTRATES

The present invention relates to a process for coating substrates and also coated substrates obtainable by the above-mentioned process.

There is a need in the prior art to alter or to improve the surface properties of substrates by means of coatings. In particular, coatings enable the hardness or the resistance toward aggressive substances to be improved. An extremely wide variety of substrates come into question for such surface treatment. Firstly, there is a need to reduce the tendency to soiling in the case of building materials, for example stone or tiles. Secondly, it is also possible for increased resistance toward aggressive substances, for example chemicals, to be wanted. Efforts are also made to reduce the tendency to soiling of such materials by means of coatings.

It is also possible to improve the surface properties by means of coatings in the field of woven and knitted fabrics. This is particularly the case when, for example, the stability of a composite is ensured by the base substrate but the resistance toward aggressive substances or else the tendency to soiling of the base substrate is low.

One possible way of applying a coating is the sol-gel process. Here, a composition is applied to the substrate and this subsequently cures to form a stable composite. A particular problem in known sol-gel processes is that the solvent used has to be removed from the coating during curing in order to achieve curing or crosslinking of the coating. Owing to the chemical and physical processes taking place during curing, the resulting layer has structural defects which can lead to cracks.

This is problematical since the sol-gel coatings customarily used have a thickness of only a few 100 nm. The porosities within the layer formed which occur as a result of the curing and crosslinking reactions then frequently lead to cracks. The cracks and pores formed can be reduced by targeted sintering, i.e. heat treatment. However, the problem that cracks which have been formed can no longer be eliminated by further heat treatment occurs at greater layer thicknesses. It is therefore necessary to apply multiple coatings to produce thicker layers. One possible way of exercising a positive influence on crack formation is disclosed in U.S. Pat. No. 5,076,980, in which suitable drying conditions not only in respect of the temperature but also in respect of the relative atmospheric humidity at which the coated substrate dries have been found.

The technical object which the present invention is to achieve is to provide a process for coating substrates with sol-gel coatings, in which high layer thicknesses can be achieved without cracks occurring, with the application of multiple coatings being avoided. A further object of the present invention is the provision of a coated substrate in which the coating applied by a sol-gel process is free of cracks.

The technical object of the present invention is achieved by a process for coating substrates, which comprises the steps:
a) provision of a substrate,
b) application of a composition to at least one surface of the substrate, the composition comprising a silane of the general formula $(Z^1)Si(OR_3)$, where $Z^1$ is OR or Gly (Gly=3=glycidyloxypropyl) and R is an alkyl radical having from 1 to 6 carbon atoms and all radicals R can be identical or different, an inert solvent and an initiator and the inert solvent having a boiling point under the drying conditions of step c) which is in a range from 50° C. above to 50° C. below the drying temperature of step c) and the boiling point of the inert solvent under the drying conditions of step c) being at least 80° C., and
c) drying of the composition applied in step b) at a drying temperature of from 100° C. to 250° C.

The process of the present invention is not limited to any specific substrates. The substrates can be either open-pored or closed-pored. The substrates should not display any change at the selected drying temperature of step c), i.e. be thermally stable at these drying temperatures.

The substrate can be an open-pored or closed-pored substrate. In particular, it is possible for the substrate to be a woven fabric, a knitted fabric, a film, a tile, stone or a metallic substrate.

In a preferred embodiment, the composition of step b) contains a second silane having the general formula $(Z^2)_zSi(OR)_{4-z}$, where R is an alkyl radical having from 1 to 6 carbon atoms and $Z^2$ is $H_aF_bC_n$, where a and b are integers, all radicals R can be identical or different, a+b=1+2n, z=1 or 2 and n is from 1 to 16, or when $Z^1$ is Gly, $Z^2$ is Am (Am=3-aminopropyl) with z=1.

Preference is given to 3-glycidyloxypropyltriethoxysilane and/or 3-glycidyloxypropyltrimethoxysilane being present as silane and/or 3-aminopropyltrimethoxysilane and/or 3-aminopropyltriethoxysilane being present as second silane in the composition of step b).

Further preference is given to tetraethoxysilane being present as silane and a silane of the formula $(H_aF_bC_n)_zSi(OR)_{4-z}$, where a and b are integers, a+b=1+2n, z is 1 or 2, n is from 1 to 16 and all radicals R can be identical or different, with preference being given to all radicals R being identical and containing from 1 to 6 carbon atoms, being present as second silane in the composition of step b).

Preference is given to tetraethoxysilane, methyltriethoxysilane, octyltriethoxysilane and/or hexadecyltrimethoxysilane being present as silane and/or 3,3,4,4,5,5,6,6,7,7,8,8,8-tridecafluorooctyltriethoxysilane being present as second silane in the composition of step b).

As inert solvent, it is possible to use any solvent which has an appropriate boiling point. In a preferred embodiment, the inert solvent does not react significantly with the further components of the composition of step b). Rather, a homogeneous, pore- and crack-free surface is surprisingly produced on the substrate by means of the inert solvent. Under the selected drying temperatures of step c), the inert solvent evaporates from the coating. It is presumed that the evaporation of the inert solvent ensures the flexibility of the curing and crosslinking composition of step b) for a longer time so that a solid structure is formed first and the inert solvent evaporates completely only after formation of the solid structure.

In a preferred embodiment, the inert solvent has a boiling point under the drying conditions of step c) which is in the range from 40° C. above to 40° C. below the drying temperature of step c), more preferably in the range from 30° C. above to 30° C. below the drying temperature of step c), more preferably in the range from 20° C. above to 20° C. below the drying temperature of step c), and the boiling point of the inert solvent is most preferably in the range from 10° C. above to 10° C. below the drying temperature of step c). The boiling point of the inert solvent under the drying conditions of step c) is preferably virtually identical to the drying temperature of step c).

As inert solvent, it is possible to use a wide variety of inert solvents. The inert solvent can be selected as a function of the drying temperature of step c). In a preferred embodiment, the inert solvent is selected from the group consisting of alcohols, formamides, ketones, ethers and mixtures thereof. In a more preferred embodiment, the inert solvent is not water.

The amount of inert solvent in the composition of step b) is not limited further. In a preferred embodiment, from 0.1 to 200 mol % of inert solvent, based on the total molar amount of silane of the composition of step b), are present. In a more preferred embodiment, from 0.2 to 160 mol %, more preferably from 0.5 to 150 mol % and most preferably from 1.0 to 100 mol %, of inert solvent are present in the composition of step b).

The inert solvent preferably has a boiling point under the drying conditions of step c) of at least 90° C., more preferably at least 100° C., in particular at least 110° C. and most preferably at least 120° C.

Furthermore, an initiator is present in the composition of step b). The initiator is, in a preferred embodiment, an acid or a base which is preferably an aqueous acid or base.

If an acid is used as initiator, preference is given to using such an amount of acid that the sol obtained has a calculated pH of from 2 to 6. If a base is used as initiator, preference is given to using such an amount of base that the sol obtained has a calculated pH of from 8 to 11. The addition of the aqueous base or acid is preferably carried out so that the molar ratio of water to compounds of the formula $(Z^1)_1Si(OR)_3$, in particular $GlySi(OR)_3$, is from 100 000:1 to 10:1, preferably from 1000:1 to 100:1, in the preparation of the mixture.

In a preferred embodiment, at least one further solvent which preferably has a lower boiling point than the inert solvent can be present in the composition of step b). Preferred further solvents are low-boiling alcohols such as ethanol or isopropanol.

At least one further additive can be present in the composition of step b). As additives, it is possible to use all compounds with which those skilled in the art are familiar in the context of sol-gel coatings.

More preferably oxide particles selected from among the oxides of Ti, Si, Zr, Al, Y, Sn, Ce and mixtures thereof can be present in the composition of step b). The oxide particles can preferably have a hydrophobic surface. Organic radicals $X_{1+2n}C_n$, where n is from 1 to 20 and X is hydrogen and/or fluorine, bound to silicon atoms are preferably present on the surface of the oxide particles.

If the oxide particles have a hydrophobic surface, the surface of the oxide particles is preferably partially hydrolyzed under the reaction conditions of the sol-gel formation of the present invention. Here, reactive sites which react with the organic silicon compounds of the composition from step b) are preferably formed. During curing, these organic silicon compounds are covalently bound to the oxide particles via, for example, —O— bonds. In this way, the oxide particles are covalently crosslinked with the curing sol-gel. The layer thickness of the cured layer can surprisingly be increased further as a result.

The oxide particles can have a mean particle size of from 10 to 1000 nm, preferably from 20 to 500 nm, more preferably from 30 to 250 nm.

If the coating is to be transparent and/or colorless, preference is given to using only oxide particles which have a mean particle size of from 10 to 250 nm. The mean particle size is based on the size of the primary particles or, if the oxides are present as agglomerates, on the size of the agglomerates. The particle size is determined by light scattering methods, for example by means of an instrument of the HORIBA LB 550® type (from Retsch Technology).

The composition of step b) can be applied to the substrate by means of various generally known methods. In particular, the composition can, for example, be applied by doctor blade coating, painting, rolling, spraying or by dipping the substrate into the composition.

The drying of the composition in step c) can be carried out by any method known to those skilled in the art. In particular, drying can be carried out in an oven. Particular preference is given to a convection oven, an infrared field and/or a microwave radiator. In a preferred embodiment, the drying temperature is essentially constant and preferably constant during drying in step c). This means that preference is given to heating, for example, an oven to the desired drying temperature and introducing the substrate to which the composition of step b) has been applied into the preheated oven. After the desired drying time which is necessary to dry and, if desired, cure the applied composition, the coated substrate is removed from the drying apparatus.

The drying times are not limited further. They should, however, be selected so that complete removal of the solvent from the applied coating is possible. The drying time of step c) is preferably in the range from 1 minute to 3 hours.

In a preferred embodiment, the composition is applied to the substrate in step b) in such an amount that after drying in step c) a layer of the dried composition having a layer thickness of from 0.05 to 10 μm is present on the substrate. Preference is given to a layer having a layer thickness of from 0.1 μm to 9 μm, more preferably from 0.2 μm to 8 μm and most preferably from 0.3 μm to 7 μm, being present on the dried substrate.

The coated substrate of the present invention surprisingly displays a very high freedom from cracks, with essentially no cracks being present in the coating in a preferred embodiment.

The chromium oxide-oil test as specified in DIN EN ISO 10 545-14 is a test for confirming the freedom from cracks. Here, chromium oxide, which has a green color, is applied to the coating to be tested. After removal of the chromium oxide by the procedure described in DIN EN ISO 10 545-14, the degree of discoloration of the coating is an indicator for the freedom from pores or cracks of a surface. The coatings according to the invention display a very highly pore- and crack-free surface, so that the chromium oxide-oil can be removed leaving virtually no residue.

Thus, the substrates coated by the process of the present invention display an improved coating compared to the coatings of the prior art. In particular, it is surprisingly possible to apply thicker coatings and avoid multiple application in a multicoating process. The coatings of the present invention can be used as scratch-resistant layers on flat polymer structures and for sealing natural stone.

In a preferred embodiment, at least one further coating can be applied prior to application of the composition in step b). This coating can be, for example, a printing such as a printed design.

In a more preferred embodiment, at least one further coating can be applied after application of the composition in step b). This further coating can also be applied after drying in step c). This further coating can be, for example, a printing such as a printed design.

Thus, a coated substrate which is obtainable by the process described here has many possible applications. In particular, the avoidance of multiple coatings makes it possible to produce coated substrates more efficiently.

EXAMPLES

Example 1

A mixture is prepared from 25.5 g of 3,3,4,4,5,5,6,6,7,7,8,8,8-tridecafluorooctyltriethoxysilane, 4.45 g of 3-glycidyloxypropyltriethoxysilane and 83.2 g of tetraethyl orthosilicate.

17.44 g of a dispersion of 4 g of a hydrophobic silica prepared by flame hydrolysis (AEROSIL® R8200 from Degussa AG) in 2-pentanone (b.p.: 102° C.) are added to the abovementioned mixture while stirring. The dispersion of silica in 2-pentanone was prepared beforehand by mixing the silica and 2-pentanone under the action of ultrasound for 1 minute and has a concentration of 10% by weight. The particle size distribution of the dispersion was determined by light scattering on a particle size measurement instrument from Horiba. The following values were found: D50=109 nm, 10%=61 nm, 90%=189 nm. The dispersion has a zeta potential of −6.03 mV at a magnitude of 211 674 mV.

After addition of the dispersion to the mixture, 5.45 µl of 63% strength nitric acid are added while stirring. 3.2 g of 3-aminopropyltriethoxysilane are subsequently added while stirring vigorously, taking care to ensure that the temperature of the reaction mixture does not exceed 40° C. The sol obtained in this way is stirred for a further 48 hours.

A marble slab "Carrara Antik" having dimensions of 7.5× 7.5 cm is cleaned by means of a cleaner with the aid of a brush and water. The stone slab is subsequently dried at 60° C. for 24 hours and subsequently cooled in a desiccator.

An about 50 µm thick layer of the sol is applied to the stone plate in a hand drawing frame. The coated stone slab is allowed to stand at room temperature for 1 hour and is subsequently heated at 150° C. for 15 minutes. After 24 hours, the coating was characterized. After drying and curing, the coating has a mean layer thickness of about 20 µm.

Assessment of the Surface Properties:

A droplet of water was applied to the coating. This droplet of water is not absorbed into the coating, but remains on the coating.

The chromium oxide-oil test in accordance with DIN EN ISO 10 545-14 indicates that the $Cr_2O_3$ can be removed completely after being present on the coating for 24 hours. No discoloration occurs.

Comparative Example 2

A stone slab is coated by a method analogous to example 1 using ethanol (b.p.: 78° C.) instead of 2-pentanone for producing the silica dispersion.

Assessment of the Surface Properties:

A droplet of water is applied to the coating. This droplet of water is absorbed into the coating.

The chromium oxide-oil test in accordance with DIN EN ISO 10 545-14 indicates that the $Cr_2O_3$ cannot be removed completely after being present on the coating for 24 hours. The $Cr_2O_3$ leaves green flecks in pores and holes formed in the coating.

In summary, it can be seen that substrates can be provided with a crack-free coating by the process of the present invention. The coating of the present invention is resistant to environmental influences and ensures reliable protection of the substrate underneath.

The invention claimed is:

1. A process for coating substrates, comprising the following steps:
    a) provision of a substrate, wherein the substrate is a woven fabric, a knitted fabric, a tile or a stone,
    b) application of a composition to at least one surface of the substrate, the composition obtained by:
    preparing a mixture comprising 3,3,4,4,5,5,6,6,7,7,8,8,8-tridecafluorooctyltriethoxysilane, 3-glycidyloxypropyl-triethoxysilane and/or 3-glycidyloxypropyltrimethoxysilane, and at least one selected from the group consisting of tetraethoxysilane, methyltriethoxysilane, octyltriethoxysilane and hexadecyltrimethoxysilane,
    adding a dispersion of hydrophobic oxide particles selected from the group consisting of Ti, Si, Zr, Al, Y, Sn, Ce and mixtures thereof in an inert solvent to the mixture,
    adding an acidic initiator and 3-aminopropyltrimethoxysilane and/or 3-aminopropyltriethoxysilane, thereby obtaining said composition,
    the inert solvent having a boiling point under the drying conditions of step c) which is in a range from 50° C. above to 50° C. below the drying temperature of step c) and the boiling point of the inert solvent under the drying conditions of step c) being at least 80° C., and
    c) drying of the composition applied in step b) at a drying temperature of from 100° C. to 250° C.

2. The process as claimed in claim 1, wherein from 0.1 to 200 mol % of inert solvent, based on the total molar amount of all silanes, is present in the composition of step b).

3. The process as claimed in claim 1, wherein the inert solvent is selected from the group consisting of alcohols, formamides, ketones, ethers and mixtures thereof.

4. The process as claimed in claim 1, wherein the inert solvent is not water.

5. The process as claimed in claim 1, wherein the composition of step b) further comprises at least one solvent which has a lower boiling point than the inert solvent.

6. The process as claimed in claim 1, wherein the composition of step b) further comprises at least one additive.

7. The process as claimed in claim 1, wherein organic radicals $X_{1+2n}C_n$, where n is from 1 to 20 and X is hydrogen and/or fluorine, bound to silicon atoms are present on the surface of the oxide particles.

8. The process as claimed in claim 1, wherein the composition is applied to the substrate in step b) in such an amount that after drying in step c) a layer of the dried composition having a layer thickness of from 0.05 to 10 µm is present on the substrate.

9. The process as claimed in claim 1, wherein the drying temperature during drying in step c) is constant.

10. The process as claimed in claim 1, wherein at least one coating is applied prior to application of the composition in step b).

11. The process as claimed in claim 1, wherein at least one coating is applied after application of the composition in step b).

12. A coated substrate obtained by the process as claimed in claim 1.

13. The process as claimed in claim 1, wherein the inert solvent is 2-pentanone.

14. The process as claimed in claim 1, wherein the substrate is a marble slab.

* * * * *